(12) United States Patent
Moghe et al.

(10) Patent No.: US 10,343,536 B2
(45) Date of Patent: Jul. 9, 2019

(54) INTELLIGENT COIL CONTROL FOR VEHICLE WIRELESS POWER TRANSFER (WPT)

(71) Applicant: Cisco Technology, Inc., San Jose, CA (US)

(72) Inventors: Ashok Krishnaji Moghe, Pleasanton, CA (US); John George Apostolopoulos, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/790,308

(22) Filed: Oct. 23, 2017

(65) Prior Publication Data

US 2019/0039463 A1 Feb. 7, 2019

Related U.S. Application Data

(60) Provisional application No. 62/541,814, filed on Aug. 7, 2017.

(51) Int. Cl.
*H02J 7/02* (2016.01)
*B60L 11/18* (2006.01)

(52) U.S. Cl.
CPC .......... *B60L 11/182* (2013.01); *H02J 7/025* (2013.01)

(58) Field of Classification Search
CPC ................ B60L 11/182; H02J 7/025
USPC ...................................... 320/108
See application file for complete search history.

(56) References Cited

U.S. PATENT DOCUMENTS

| 9,365,128 | B2 | 6/2016 | Sarkar et al. | |
|---|---|---|---|---|
| 9,371,007 | B1 | 6/2016 | Penilla et al. | |
| 9,608,465 | B2 | 3/2017 | Keeling et al. | |
| 9,637,014 | B2* | 5/2017 | Schneider et al. | H02J 50/12 |
| 9,941,708 | B2* | 4/2018 | Keeling et al. | H02J 5/005 |
| 2011/0221387 | A1* | 9/2011 | Steigerwald et al. | B60L 11/182 320/108 |
| 2014/0021908 | A1 | 1/2014 | McCool et al. | |
| 2016/0318413 | A1* | 11/2016 | Roehrl et al. | B60L 11/182 |
| 2016/0372955 | A1* | 12/2016 | Fackelmeier et al. | H01Q 9/0485 |

(Continued)

FOREIGN PATENT DOCUMENTS

CN 105844432 A 8/2016

OTHER PUBLICATIONS

"Managed Wireless Power Network", https://www.airfuel.org/technologies/infrastructure, 2016, 1 page, Accessed on Aug. 29, 2017, AirFuel Alliance.

*Primary Examiner* — Sun J Lin
(74) *Attorney, Agent, or Firm* — Behmke Innovation Group LLC; James Behmke; Stephen D. LeBarron

(57) ABSTRACT

In some embodiments, a device in a network receives vehicle characteristic data regarding a set of vehicles. The device identifies, based on the received vehicle characteristic data regarding the set of vehicles, a particular ground-based charging coil with which charging coils of the set of vehicles are expected to be in a close proximity. The device determines, based on the received vehicle characteristic data regarding the set of vehicles, a set of power levels and times at which the particular ground-based charging coil is to be powered. The device dynamically controls the particular ground-based charging coil to be powered at the determined set of power levels and times.

20 Claims, 11 Drawing Sheets

(56) References Cited

U.S. PATENT DOCUMENTS

2018/0072166 A1\* 3/2018 Percebon et al. ..... B60L 11/182

\* cited by examiner

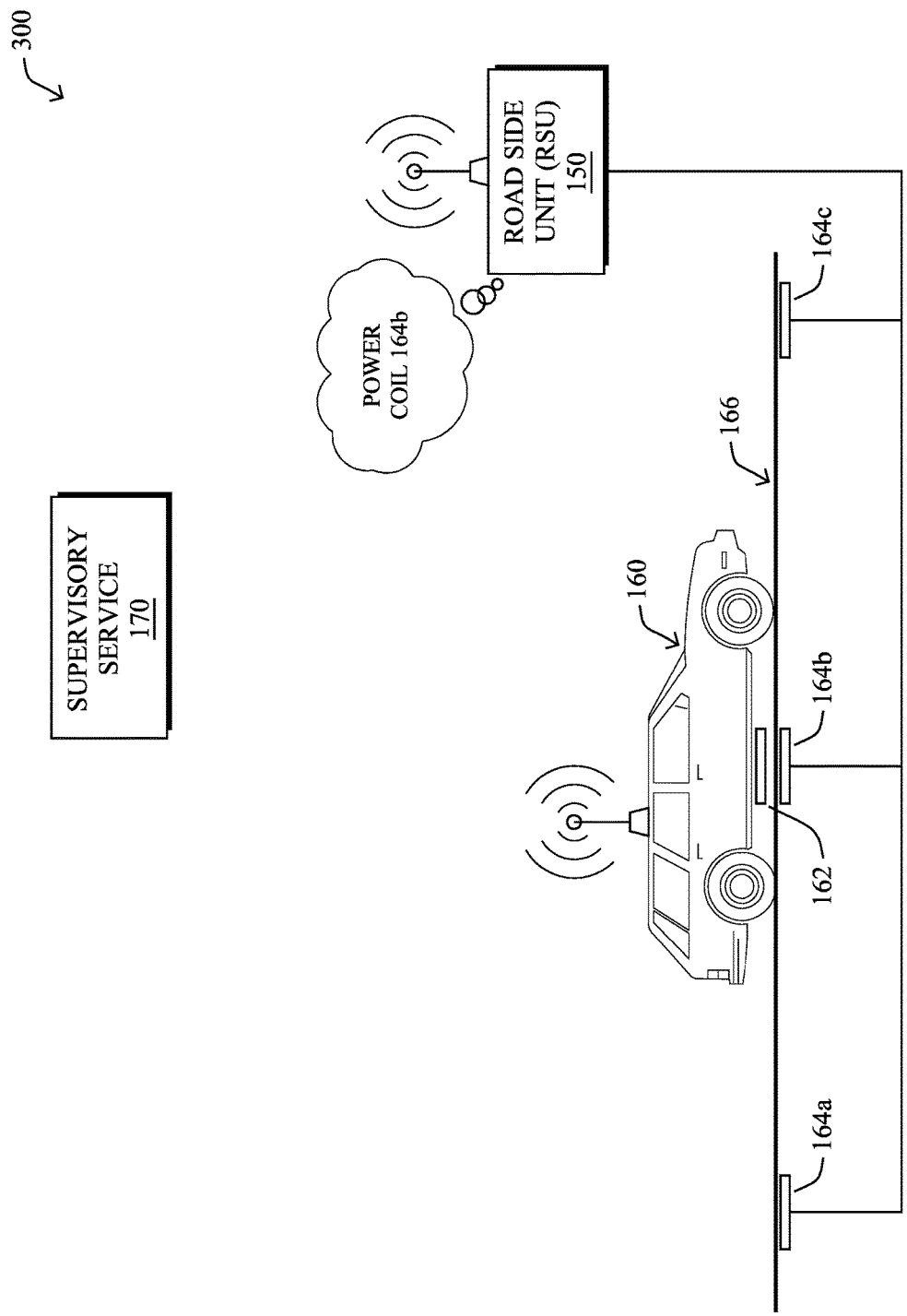

US 10,343,536 B2

INTELLIGENT COIL CONTROL FOR VEHICLE WIRELESS POWER TRANSFER (WPT)

RELATED APPLICATION

This application claims priority to U.S. Provisional Patent Appl. No. 62/541,814, filed on Aug. 7, 2017, entitled "INTELLIGENT COIL CONTROL FOR VEHICLE WIRELESS POWER TRANSFER (WPT)," by Moghe, et al., the contents of which are incorporated herein by reference.

TECHNICAL FIELD

The present disclosure relates generally to computer networks, and, more particularly, to intelligent coil control for vehicle wireless power transfer (WPT) systems.

BACKGROUND

Wireless power transfer (WPT) is an emerging technology that has proven to be effective for charging vehicles, such as electric vehicles (EVs). In a typical WPT setup for EVs, a ground-based charging coil is supplied power, thereby inducing a current remotely in a second, vehicle-based coil located at the bottom of the EV.

No standard yet exists with respect to EV configurations and many EVs vary in several aspects from each other when it comes to the battery configurations, power levels, charging rates, and so on. Often, these can vary across different makes and models. Such variations can also be due to model year changes and different options. For example, one vehicle model may be fitted with large, expensive coils and a battery management system (BMS), to enable faster WPT charging. In contrast, a budget version of the same model may be equipped with a standard set of coils and a BMS that supports a lower rate charging. In other words, it is envisioned that different EVs in the future will have different WPT charging capabilities.

In addition, as battery wears out, the rate and level at which the battery can absorb energy may change. Therefore, the age and number of charge/discharge cycles a battery pack has gone through will also play a role in the power transfer capability and efficiency. A common charging infrastructure that will encounter a large variance of these scenarios will need to be capable of handling these variations and still be able to operate optimum level of efficiency.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 3A-3D illustrate an example of powering a ground-based charging coil for an upcoming vehicle;

DESCRIPTION OF EXAMPLE EMBODIMENTS

Overview

Figure 1A:
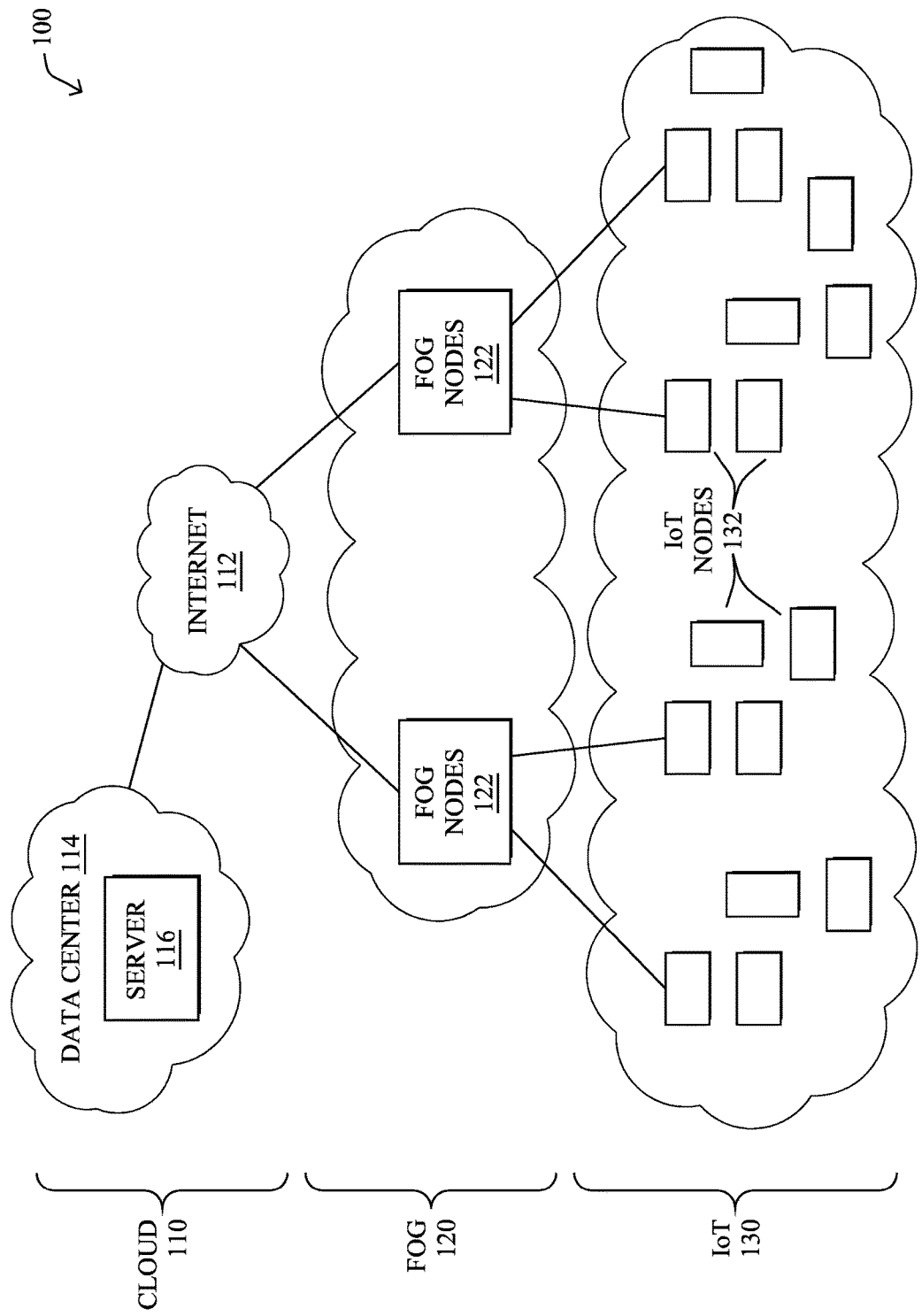
FIGS. 1A-1B illustrate an example communication network.

According to one or more embodiments of the disclosure, a device in a network receives vehicle characteristic data regarding a set of vehicles. The device identifies, based on the received vehicle characteristic data regarding the set of vehicles, a particular ground-based charging coil with which charging coils of the vehicles are expected to be in close proximity. The device determines, based on the received vehicle characteristic data regarding the set of vehicles, a set of power levels and times at which the particular ground-based charging coil is to be powered. The device dynamically controls the ground-based charging coil to be powered at the determined power levels and times.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1A is a schematic block diagram of an example simplified communication network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 1B:
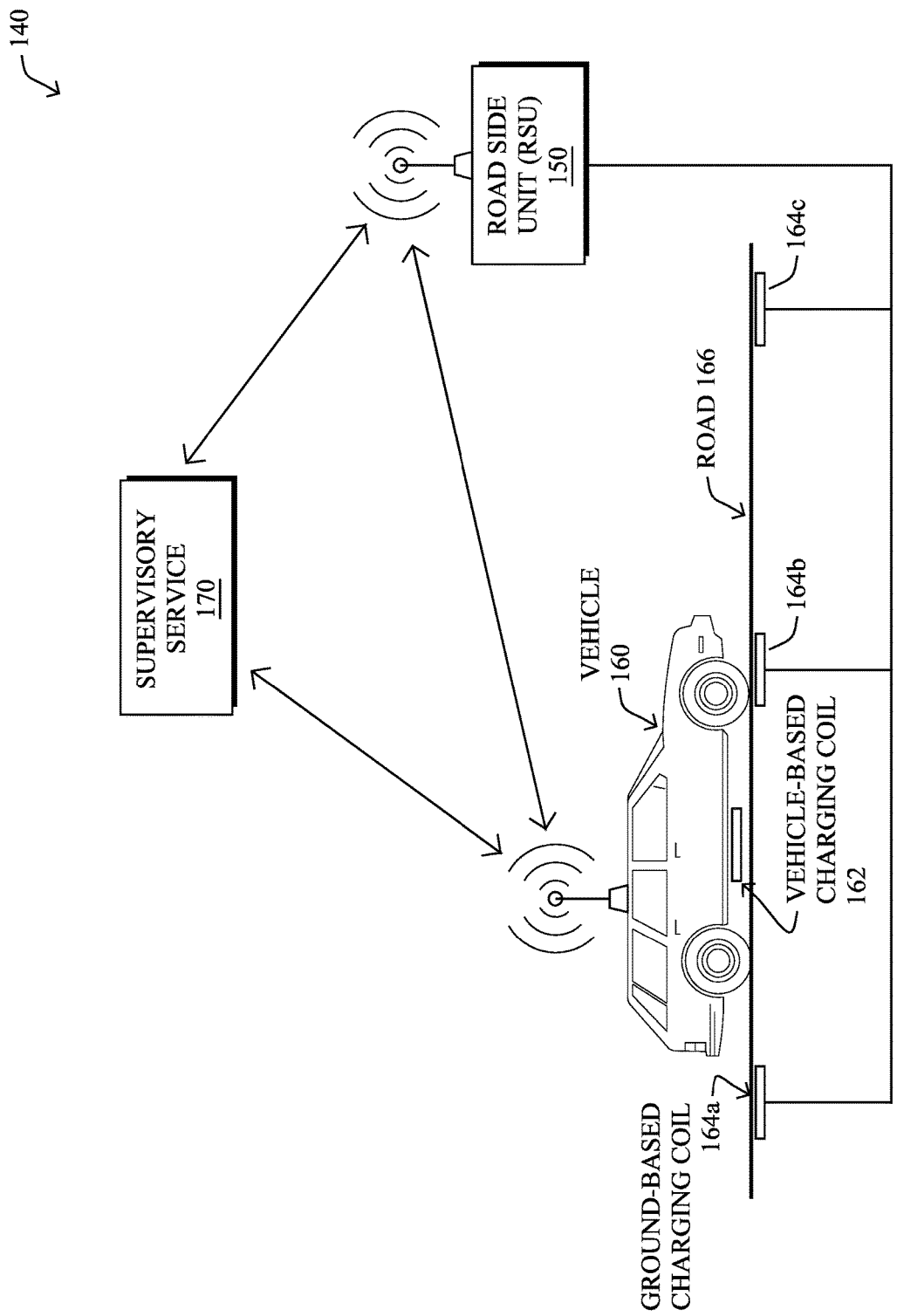

FIG. 1B illustrates an example wireless power transfer (WPT) system 140, according to various embodiments. In particular, WPT system 140 may include any or all of the following components: a vehicle 160, a roadside unit (RSU) 150, one or more ground-based charging coils 164, and/or a remote supervisory service 170. During operation, WPT system 140 may be operable to provide electrical charge to a local battery of vehicle 160, which may itself be an electric vehicle (e.g., either a fully-electric or hybrid electric vehicle).

In some embodiments, WPT system 140 may be a specific implementation of communication network 100. Notably, supervisory service 170 may be implemented at the cloud layer 110, such as at a particular server 116 in a data center 114 or, alternatively, across multiple servers 116, such as part of a cloud-based service. Similarly, RSU 150 may be a fog node 122 at fog computing layer 120, while vehicle 160 may be viewed as an IoT node 132 at IoT layer 130. Thus, vehicle 160 may communicate directly with RSU 150, and/or via other IoT nodes 132 (e.g., other vehicles, etc.), and RSU 150 may provide some degree of processing over the communicated data.

RSU 150 may communicate with supervisory service 170 via a WAN, such as the Internet 112 or another WAN. For example, RSU 150 may communicate with supervisory service 170 by leveraging a hardwired network connection, cellular or other wireless connection, satellite connection, or the like. Communications between vehicle 160 and RSU 150 may generally be wireless and use any form of known wireless communication (e.g., Wi-Fi, cellular, light-based, etc.).

As would be appreciated, vehicle 160 may comprise its own local network, to allow the various components of vehicle 160 to communicate with one another. For example, vehicle 160 may comprise a controller area network (CAN) bus, IP network, or the like, to allow the various systems of vehicle 160 to communicate with one another. Such system may include, but are not limited to, an engine control unit (ECU), a battery management system (BMS) that manages the local battery of vehicle 160, and the like. A local gateway of vehicle 160 may provide communicative connectivity between the local network of vehicle 160 and other devices. For example, the local gateway of vehicle 160 may provide wireless connectivity to RCU 150 located along road 166 on which vehicle 160 is traveling. In some embodiments, vehicle 160 may also communicate directly with supervisory service 170 via the Internet 112 or another WAN, such as by leveraging a wireless connection to a cellular or satellite-based network.

In various embodiments, vehicle 160 may comprise one or more vehicle-based charging coils 162 that are electronically coupled to the battery of vehicle 160. In addition, as shown, any number of ground-based charging coils 164 may be located along road 166, such as embedded into road 166. For example, ground-based charging coils 164a-164c may be embedded into road 166 and wired to RSU 150 that provides control over the powering of ground-based charging coils 164. For purposes of clarification, the term "ground-based charging coil," generally refers to the location of the charging coil (e.g., embedded into the ground) and is not intended to imply that a coil 164 acts an electrical ground. Also note that a ground-based coil is also sometimes referred to as a "primary coil" or "grid side coil."

During operation, ground-based charging coils 164 may be powered/energized, to charge the battery of vehicle 160. Notably, when vehicle-based charging coil 162 is located within proximity of a given ground-based charging coil 164, the powered coil 164 may inductively couple with vehicle-based charging coil 162. As a result, a current will be induced in vehicle-based charging coil 164, which can be used to restore charge to the battery of vehicle 160. Such charging may be performed when vehicle 160 is stationary or in motion, depending on the implementation. In addition, while ground-based charging coils 164 are shown as embedded into road 166, other implementations provide for coils 164 to be embedded into, or placed on, a parking lot, drive-thru, driveway, or any other location at which vehicle 160 may be located.

Figure 2:
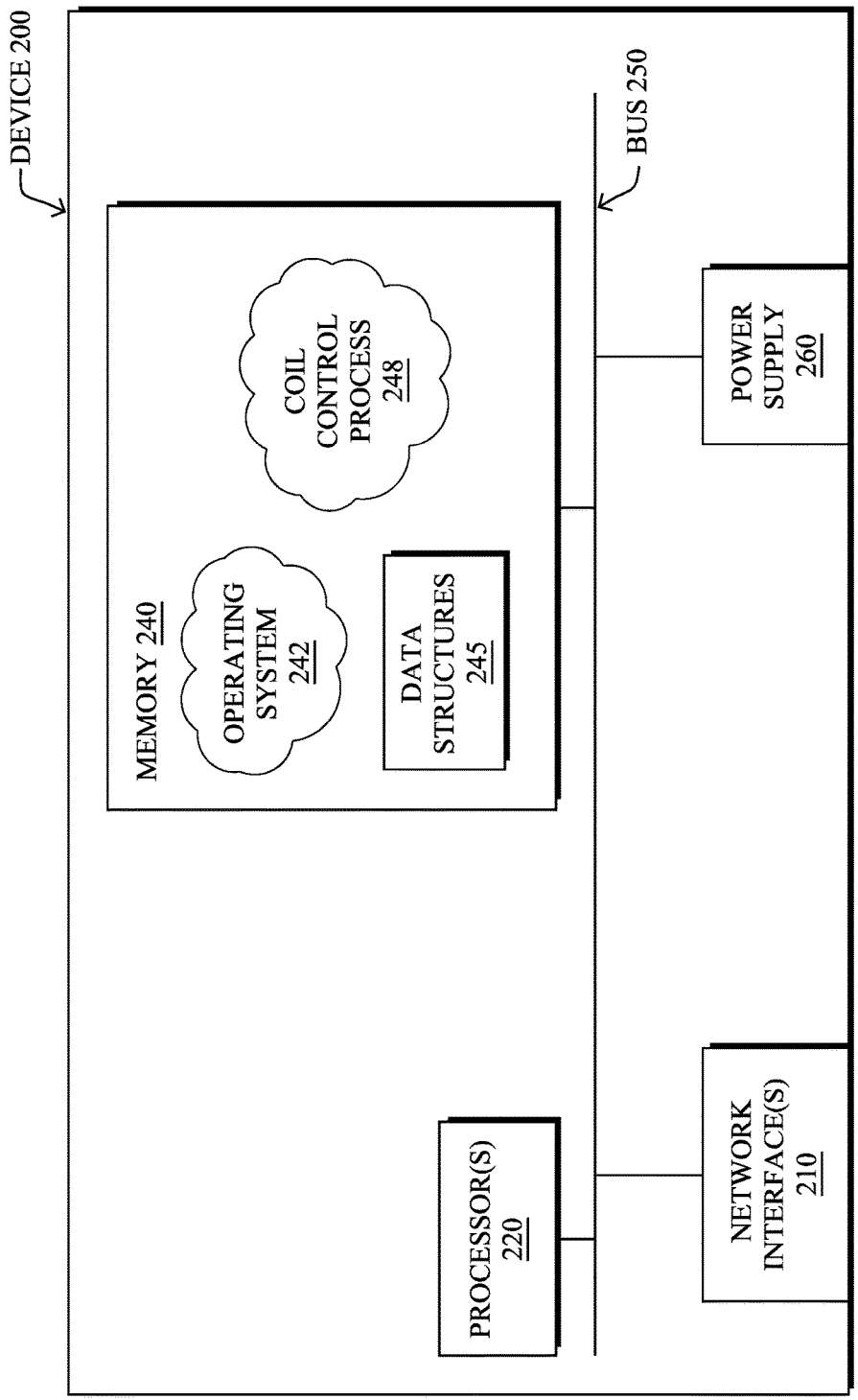
FIG. 2 illustrates an example network device/node.

FIG. 2 is a schematic block diagram of an example computing device/node 200 that may be used with one or more embodiments described herein e.g., as any of the devices shown in FIGS. 1A-1B above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration. Also, while the network interface 210 is shown separately from power supply 260, for fog modules using PLC, the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative coil control process 248, as described herein.

In general, coil control process 248 may be configured to control the charging of wireless power transfer (WPT) coils for a vehicle charging system. In some embodiments, coil control process 248 may do so by leveraging machine learning, to learn and adapt to the various characteristics of the vehicle and/or the ground-based charging coils. In general, machine learning is concerned with the design and the development of techniques that take as input empirical data (such as the charging history of the vehicle, the charging profile of the vehicle, the provided charge of the coil, etc.), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, coil control process 248 may employ one or more supervised, unsupervised, or semi-supervised machine learning models. Generally, supervised learning entails the use of a training set of data, as noted above, that is used to train the model to apply labels to the input data. For example, the training data may include test results for different coil gaps and their associated amounts of charge conveyed to the vehicle. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that coil control process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, many electric vehicles may vary from one another with respect to their battery configurations, power levels, charging rates, and so on. Often, these characteristics can vary across different makes and models. Such variations can also be due to model year changes and different options. For example, as noted, a manufacturer may offer different versions of the same model of vehicle, with a budget version having smaller charging coils and a downgraded BMS in comparison to the upgraded version of the model.

In addition, as a battery wears out, the rate and level at which the battery can absorb energy may change. Therefore, the age and number of charge/discharge cycles a battery pack has gone through will also play a role in the power transfer capability and efficiency. A common charging infrastructure that will encounter a large variance of these scenarios will need to be capable of handling these variations and still be able to operate optimum level of efficiency.

—Intelligent Coil Control for Vehicle Wireless Power Transfer (WPT)—

In certain aspects, the techniques herein leverage data available about a wireless power transfer (WPT) capable electric vehicle (EV), to intelligently control the charging (and discharging) of ground-based charging coils. For example, vehicle information such as its make, model, current charge, etc., can be used by the intelligent charging system, to precisely control the operations of the ground-based charging coils. Over time, the proposed techniques can also leverage machine learning to optimize the charging of any given vehicle, based on its charging history.

Illustratively, the techniques described herein may be performed by hardware, software, and/or firmware, such as in accordance with the illustrative coil control process 248, which may include computer executable instructions executed by the processor 220 (or independent processor of interfaces 210) to perform functions relating to the techniques described herein.

Specifically, in some embodiments, a device in a network receives vehicle characteristic data regarding a set of vehicles. The device identifies, based on the received vehicle characteristic data regarding the set of vehicles, a particular ground-based charging coil with which charging coils of the vehicles are expected to be in close proximity. The device determines, based on the received vehicle characteristic data regarding the set of vehicles, a set of power levels and times at which the particular ground-based charging coil is to be powered. The device dynamically controls the charging coil in the ground to be powered at the determined power levels and times.

Operationally, the techniques herein allow for the control of a distributed charging coil for vehicle WPT in an intelligent manner that takes into account the actual needs of the vehicle. These techniques apply to all the three forms of WPT: stationary (e.g., when the vehicle is not moving), dynamic (e.g., when the vehicle is traveling over a roadway), and quasi-dynamic. Additionally, the techniques are able to learn from the most recent data, continuously adapting the operation of the coils for optimal operation.

FIGS. 3A-3D illustrate an example of powering a ground-based charging coil for an upcoming vehicle, according to various embodiments. Continuing the example of FIG. 1B, assume in FIG. 3A that vehicle 160 is in communication with supervisory service 170 and/or RSU 150. During operation, vehicle 160 may send data regarding the vehicle characteristics to service 170 and/or RSU 150 for further processing. Example vehicle characteristics 302 may generally be divided into two categories: 1.) vehicle characteristics that can be used to control which ground-based charging coil(s) 164 are to be powered, as well as a time at which the coil should be powered, and 2.) characteristics that can be used to control the amount of powering the ground-based charging coil(s) 164.

Example vehicle characteristics 302 that can be used to identify a particular ground-based charging coil to be charged may be indicative of, but not limited to, any or all of the following:

A location of vehicle 160—for example, this information can include a Global Positioning System (GPS) coordinate from vehicle 160, navigation information from a subsystem of vehicle 160 (e.g., a vehicle navigation system), a signal that can be used to triangulate the location of vehicle 160, etc.

A velocity of vehicle 160—this information can be used to determine whether vehicle 160 is stationary or in motion, as well as timing information, to determine when the charging coils of vehicle 160 are expected to be in close proximity to a particular one of the ground-based charging coils 164. If this information is not provided, it can be derived based on changes in the location of vehicle 160 over time.

Acceleration information for vehicle 160—in some cases, vehicle 160 may also provide acceleration information as part of vehicle characteristics 302, such as from its accelerometer. If this information is not provided, it can be derived based on changes in the velocity of vehicle 160 over time.

Examples of vehicle characteristics 302 that can be used to determine an appropriate level of powering for the ground-based charging coil 164 may be indicative of, but not limited to, any or all of the following:

Make, model, and/or options of vehicle 160—this information can be used to determine the specific charging capabilities of vehicle 160 from the factory. For example, a certain manufacturer may offer upgraded charging systems on certain models over others (e.g., a larger capacity battery, a larger charging coil, etc.).

Age of vehicle 160—As noted above, battery life and charging capabilities of a vehicle can change over time. This information can be used to predict how much of a change is expected from that of the factory configuration. For example, this information may comprise the year in which vehicle 160 was made.

Battery specifications of vehicle 160—if the battery cannot be identified, such as when the make/model of vehicle 160 is not available, vehicle 160 can nonetheless provide the specifications of its battery as part of vehicle characteristics 302, in some cases.

Maintenance history of vehicle 160—For example, if the battery of vehicle 160 was replaced at some point in time, this information can be pertinent to determining the appropriate charging parameters for vehicle 160.

Battery management system (BMS) data from vehicle 160—this data can include any information regarding the current and/or prior states of the battery of vehicle 160. For example, the BMS data may be indicative of the existing charge in the battery of vehicle 160, a history of charging of the battery of vehicle 160, or the like.

Authentication information from vehicle 160—in the case where WPT charging is restricted, provided on a controlled basis (e.g., only to residents, only on a paid basis, etc.), or the like, this information can also be included in vehicle characteristics 302.

Figure 3A:
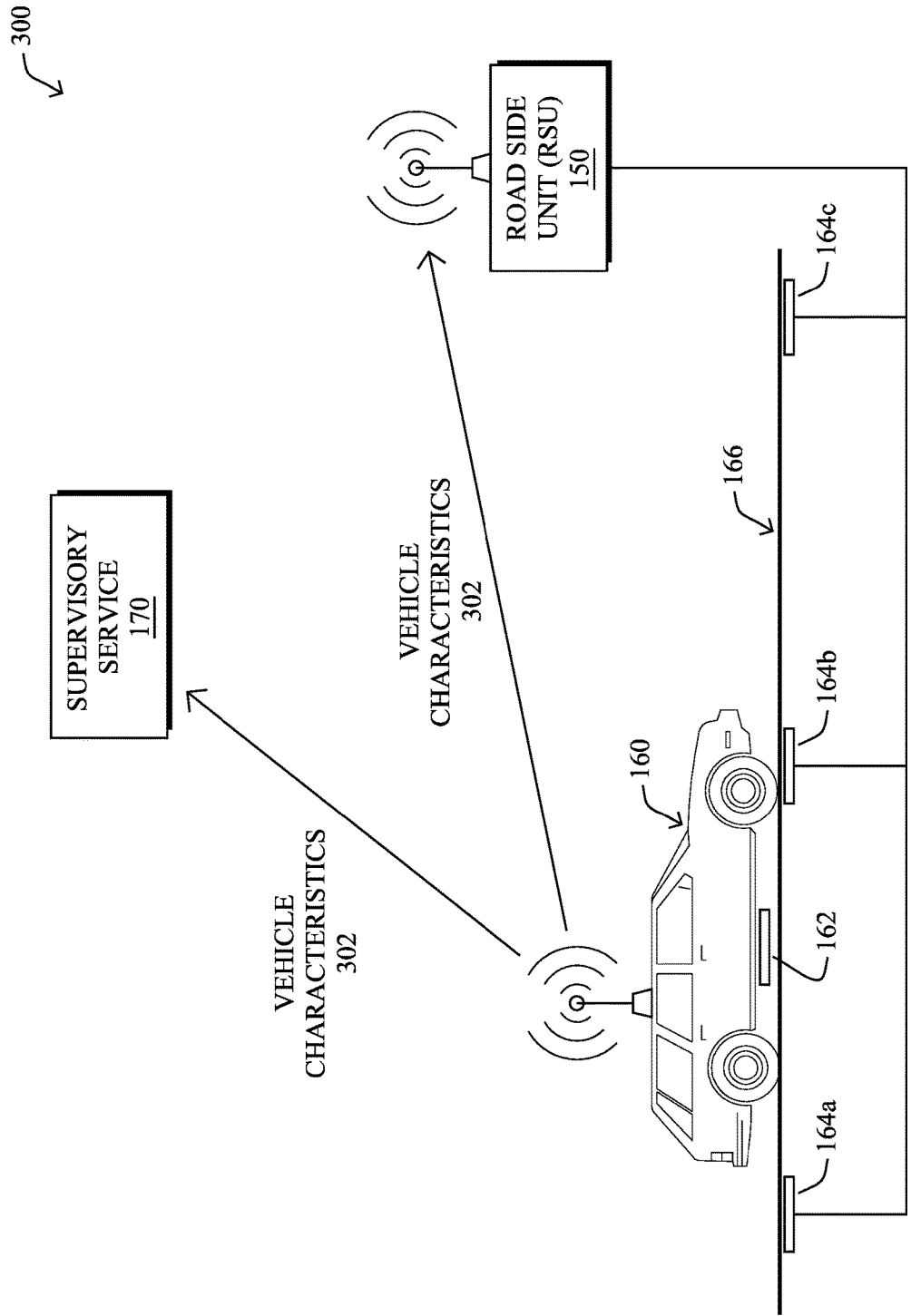
Figure 3B:
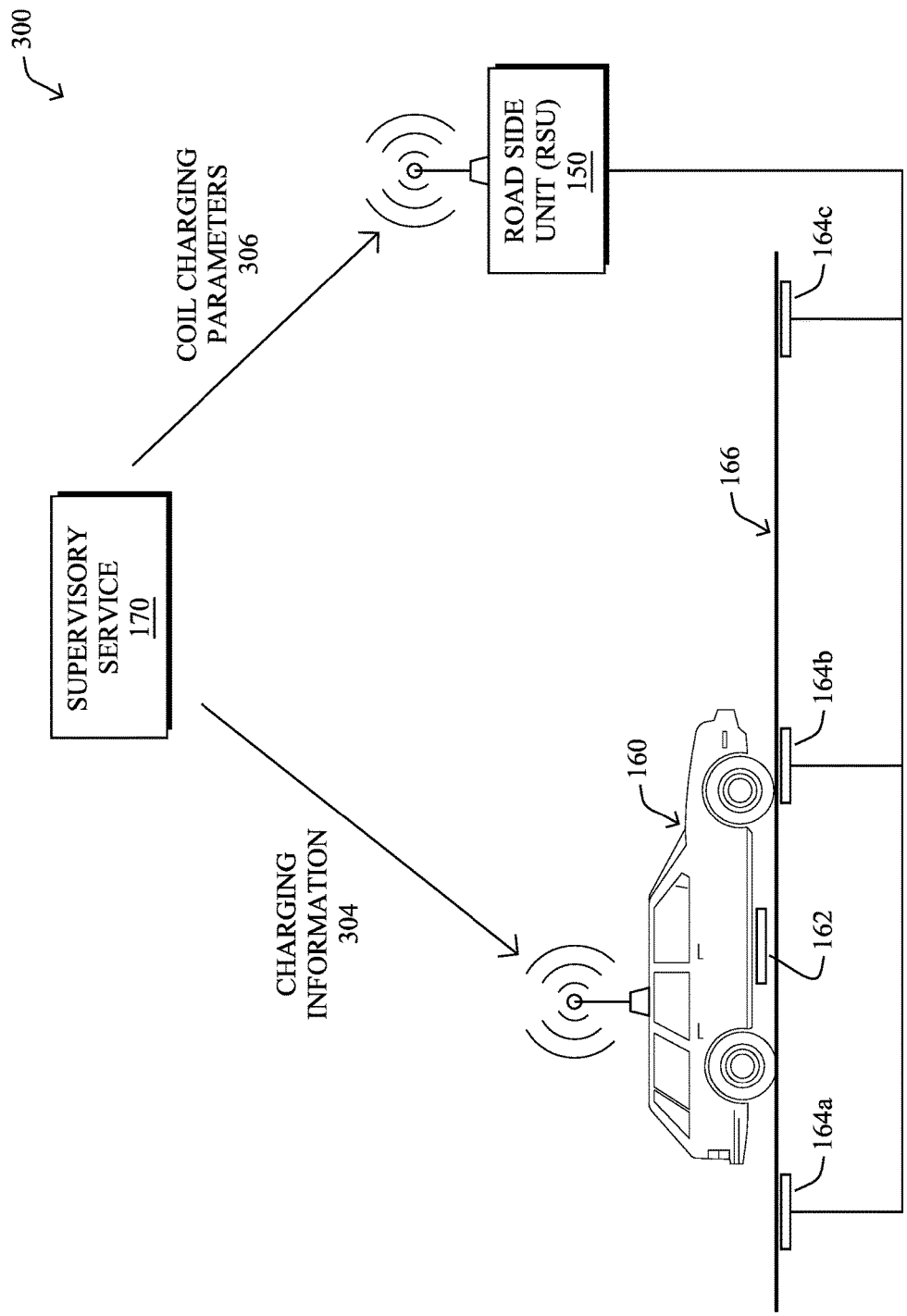

In FIG. 3B, supervisory service 170 may use the received vehicle characteristics 302, to determine the appropriate coil charging parameters 306 for ground-based charging coils 164. Generally, coil charging parameters 306 may indicate which of ground-based charging coils 164 are to be powered, if any, when coils 164 should be powered, and the appropriate power level to be supplied. For example, based on the vehicle characteristics 302, supervisory service 170 may determine that the charging coil 162 of vehicle 160 will be in close proximity (e.g., less than several feet) with that of ground-based charging coil 164$b$ at a time t=$t_1$. In addition, supervisory service 170 may determine that vehicle 160 requires charging, is authorized to charge, and/or an amount of power that should be delivered to the identified ground-based charging coil 164*b*. Note that in further embodiments, any or all of these determinations may be made at the fog layer, such as by RSU 150.

In case of dynamic WPT, supervisory service 170 may also communicate charging information 304 back to vehicle 160 regarding the charging process. For example, charging information 304 may include driving parameters while vehicle 160 is in motion (e.g., directing vehicle 160 to maintain a certain speed, stay in the current lane, etc.), confirmations or notifications regarding the charging, or the like.

In FIG. 3C, RSU 150 may provide power to ground-based charging coil 164*b*, based on coil charging parameters 306. For example, RSU 150 may cause ground-based charging coil 164*b* to be powered to a certain power level, in advance of vehicle 160 arriving at ground-based charging coil 164*b*. Thus, when vehicle-based charging coil 162 is within charging proximity of ground-based charging coil 164*b*, the two coils may inductively couple with one another, thereby transferring power to vehicle 160 that can be used to charge the battery of vehicle 160.

Figure 3D:
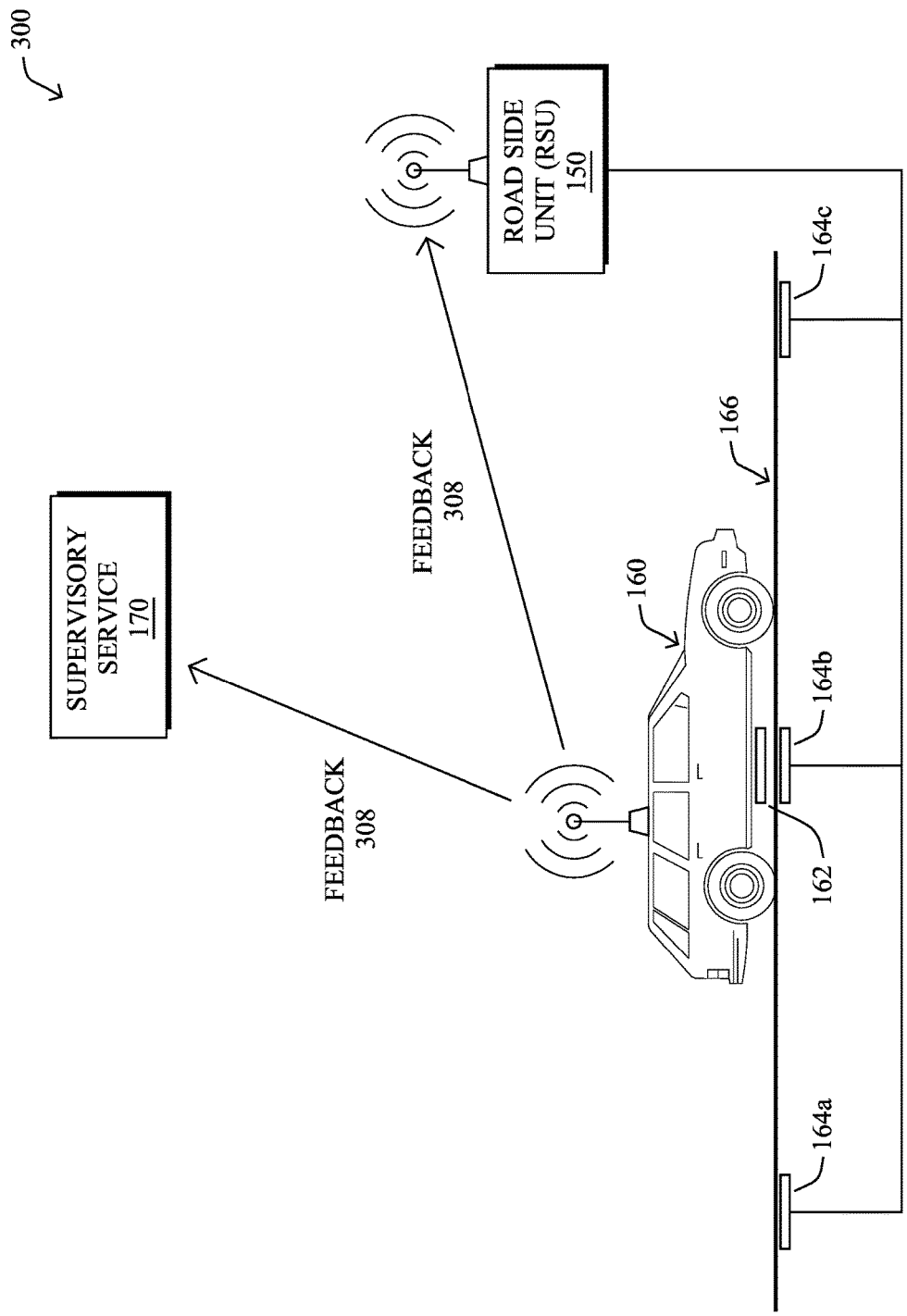

In FIG. 3D, vehicle 160 may also provide feedback 308 to supervisory service 170, and/or to RSU 150, regarding the charging from ground-based charging coil 164*b*. For example, feedback 308 may be indicative of the amount of charge that vehicle 160 was able to obtain from ground-based charging coil 164*b*, timing information in terms of the power transfer, or any other information regarding the charging operation.

According to various embodiments, the control over ground-based charging coils 164 may be performed adaptively and dynamically, thereby allowing the WPT system to "learn" the optimal charging parameters for vehicle 160 over time. For example, the WPT system may initially use heuristics, to determine the appropriate control parameters for ground-based coils 160, such as based on the make, model, year, options, etc., of vehicle 160. Over time, however, the WPT system may use feedback 308 to adapt to the actual charging capabilities of vehicle 160. Notably, in some embodiments, the techniques may also leverage machine learning to optimize the charging by capturing the actual power transfer numbers from the BMS in vehicle 160 that can be passed back to the system as part of feedback 308. Said differently, the WPT system may construct and maintain a machine learning-based power transfer model for vehicle 160. RSU 150 and/or supervisory service 170 can then use the model to compute the divergence/difference between the expected vs. achieved power transfer and efficiency. In turn, the machine learning model can be updated using feedback 308, to quickly adapt the coil charging parameters of the WPT system for subsequent transfers for vehicle 160 during subsequent charging opportunities.

More specifically, the system may operate as follows:
1. When the charging begins, the charging system may start with parameters best chosen by the system based on its knowledge base of particular vehicle make, model, options, age, weather conditions, road conditions (e.g., dry vs. wet vs. covered with snow), and so on.
2. As the power transfer continues, the communication between the RSU & the BMS will continue to collect actual power transferred to battery data. Based on this, the WPT system can compute the divergence between anticipated vs. achieved results. The divergence will be reported back to the central entity in the cloud.
3. The divergence will be used to tweak the parameters that were initially chosen based on heuristically available data (car make/model/age/road conditions/weather & so on).
4. This will be now be used to update the prediction model.
5. These updated settings will now be deployed across the system (local, city, state, national and global levels). This will make this data available for accurately predicting the starting point. Also in the case of a dynamic and quasi-dynamic WPT, these settings may be useful right away even as starting settings for next charging occurrence that may be taking place "down the road"

As would be appreciated, such a charging system may be self-learning and adaptive, using the above approach.

Figure 4:
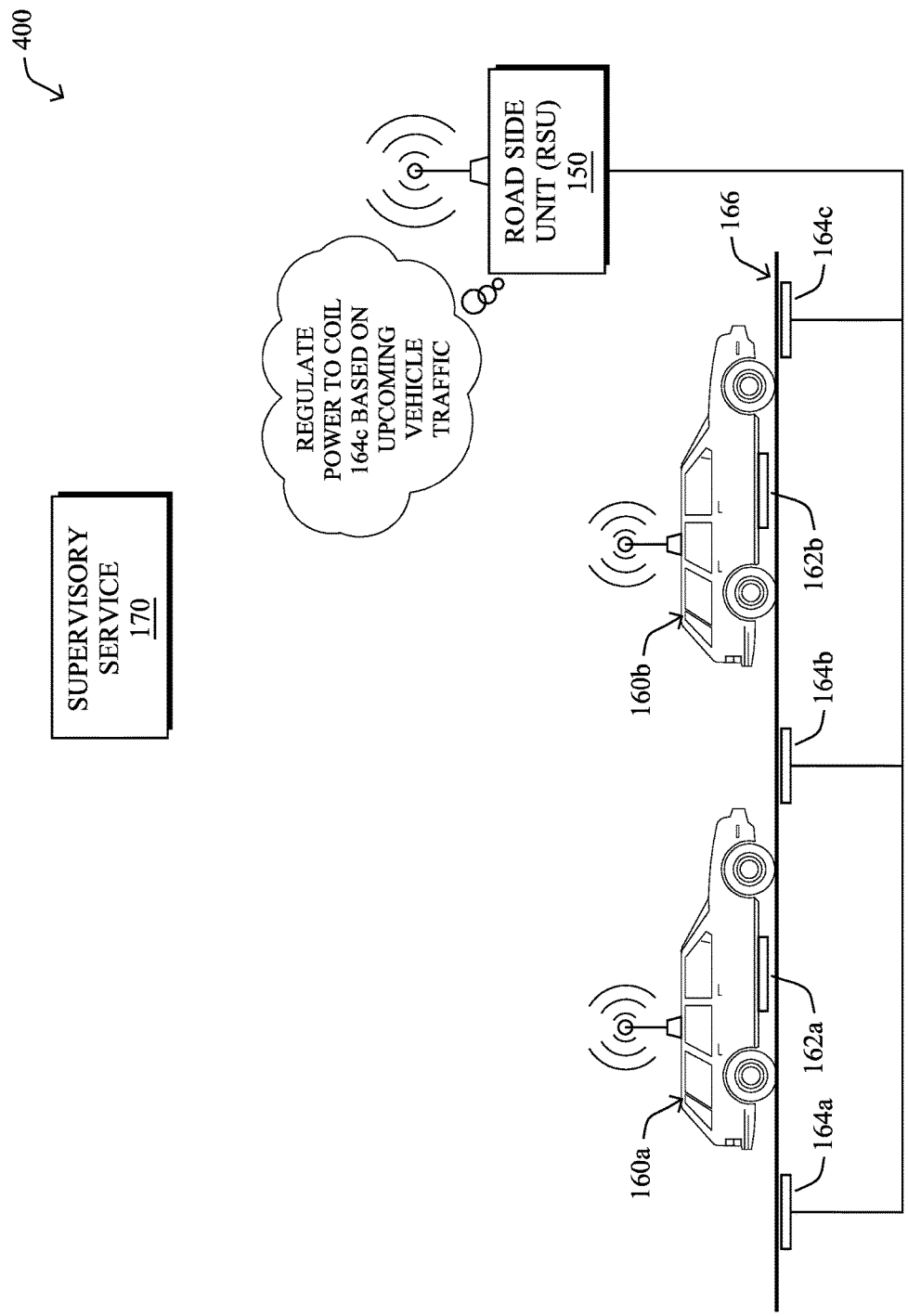
FIG. 4 illustrates an example of regulating the power to a ground-based charging coil based on upcoming traffic.

In some embodiments, the WPT system can also intelligently take into account the requirements of multiple vehicles, which may be traveling as a group or 'platoon,' in further embodiments. Notably, the BMSs of the vehicles in any given platoon may require different amounts of power and/or recovery times. For example, as shown in FIG. 4, assume that there are two vehicles: vehicle 160*a* and vehicle 160*b* that will both traverse ground-based charging coils 164 at different times. Each of vehicles 160*a*-160*b* may have different charging requirements, thus leading to different power levels being required in ground-based coils 164.

By leveraging the information available from the network about the individual vehicles 160, the coil control system can intelligently control the amount of charging and duty cycles used. One way of doing this is controlling the amount of energy transferred in each 'chunk' (e.g., set of pulses in a given timeframe). Thus, even if the system is capable of transferring say at 50 KW level, it can be controlled to deliver at 25 KW. The other way involves skipping the energy transfer for different vehicles in the platoon, in further embodiments.

Figure 5A:
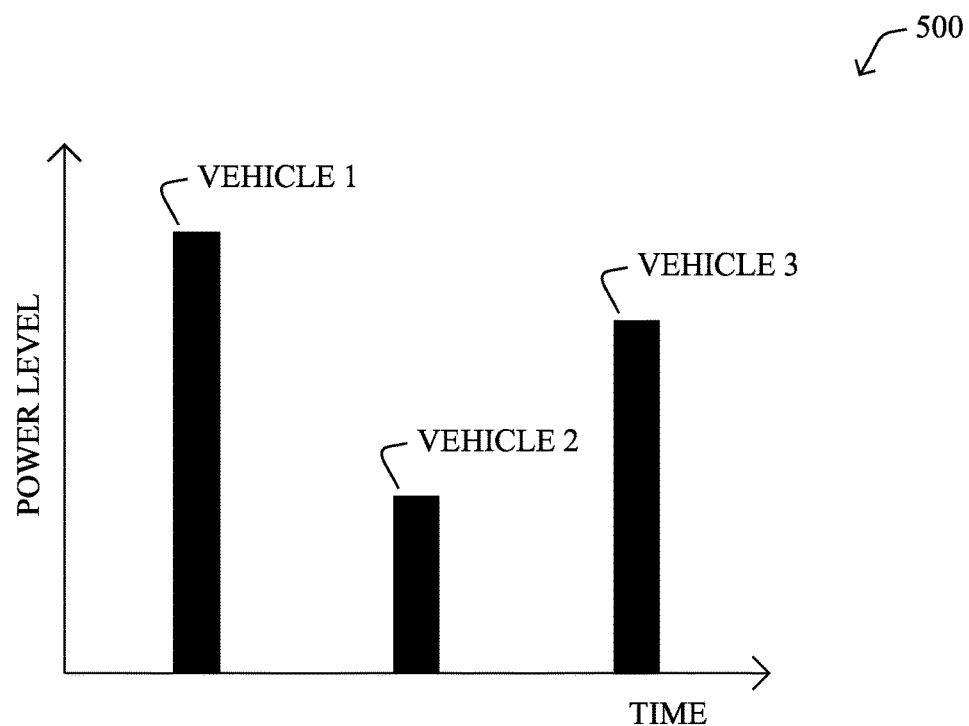
FIGS. 5A-5B illustrate plots of coil charging power levels for different coil powering strategies.
Figure 5B:
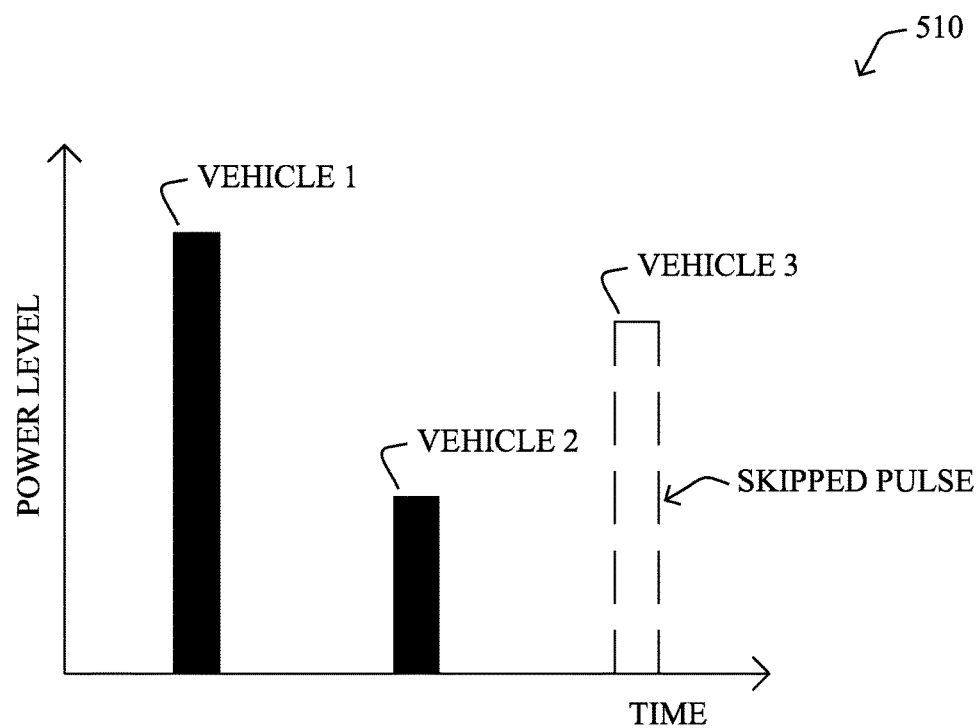

FIG. 5A-5B illustrate example plots of coil charging power levels for the two different coil powering strategies. As shown in plot 500 of FIG. 5A, a given ground-based coil may be powered to different levels, based on the charging needs and capabilities of three different vehicles crossing over the coil. In FIG. 5B, in contrast, to regulate the charging duty cycle, the WPT system may also control a second ground-based charging coil such that the same power levels used to convey energy to the first two vehicles by the first coil remain the same at the second coil, but that no powering is needed or used for the third vehicle. By skipping the powering of the second ground-based charging coil, the system is able to control the duty cycles on a per vehicle and/or coil basis.

Figure 6:
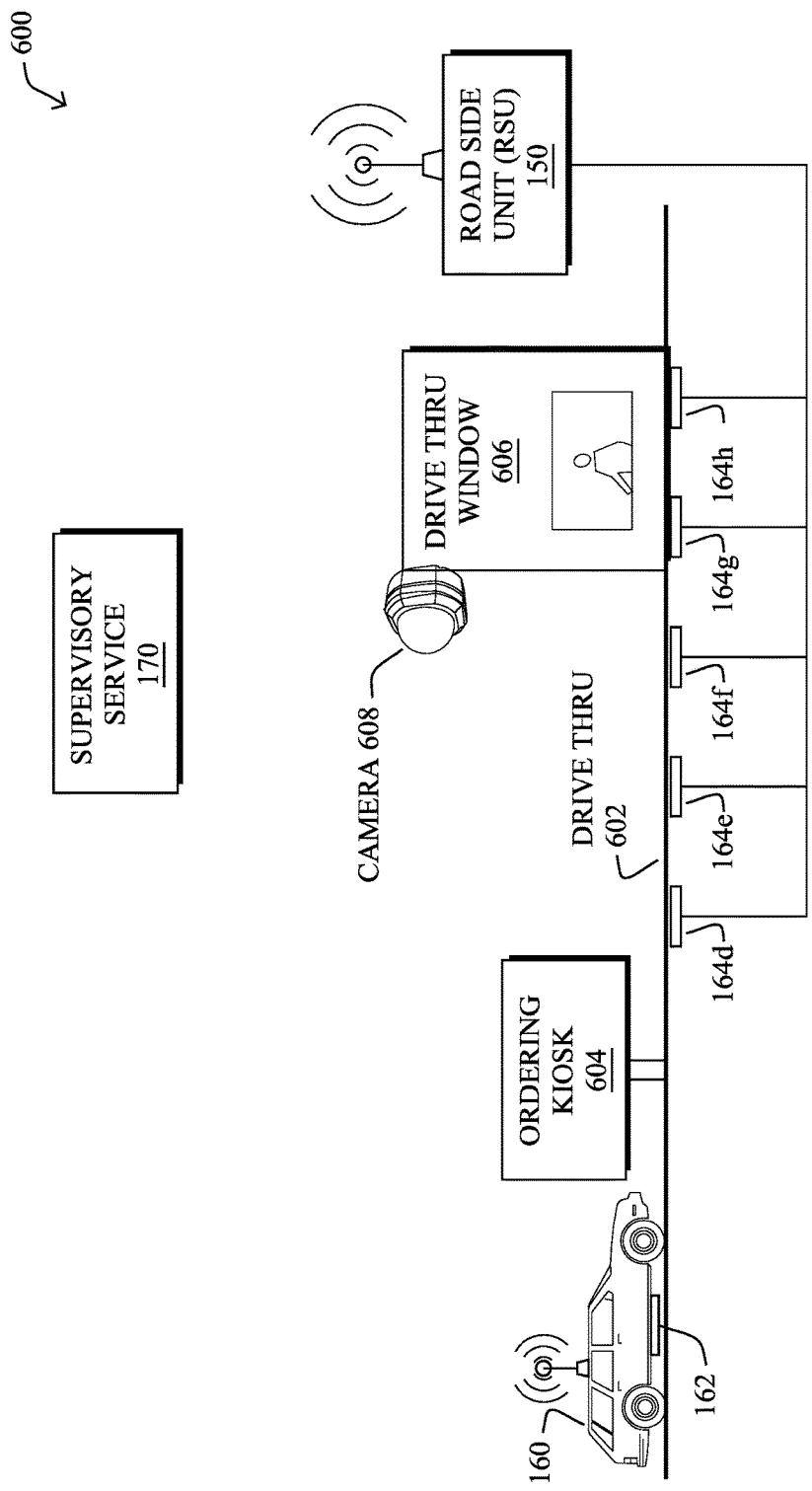
FIG. 6 illustrates an example coil charging system implemented as a drive-thru.

FIG. 6 illustrates an example use case for the intelligent coil control system disclosed herein, according to various embodiments. Notably, a drive-thru, such as drive-thru 600, offers a unique and compelling setup for deploying quasi-dynamic and dynamic WPT implementations with the disclosed coil control system. A typical drive-thru, such as a fast food restaurant or coffee shop, takes anywhere from 2-4 minutes for a vehicle 160 to reach the drive-thru window, such as window 606 shown. This is a significant amount of time to deliver sizable amount of energy. For example, at a 20 KW power level for 3 minutes, this is equivalent to delivering 4% of charge to a typical Nissan Leaf (24 KWh battery pack). When the WPT technology progresses to 100 KW level, this will be equivalent to delivering 20% capacity recharge.

More specifically, the drive-thru implementation shown in FIG. 6 may include any or all of the above elements, as well as any or all of the following:

- An app on the user's smartphone or the vehicle's dash for interacting with the coil charging system (not shown).
- Alternatively, or in addition thereto, the system may include an ordering kiosk 604 as another way of interacting with the charging system via menu prompts and options.
- Another variation can also include a camera 608 and corresponding license plate recognition (LPR) system.

The proposed drive-thru charging system may operate as follows:

1. The driver approaches a drive-thru in a WPT capable vehicle, such as vehicle 160
    - Additionally, when a driver or other user is entering the drive-thru service, the WPT system can communicate pre-emptively with the vehicle's BMS through the V2X communication using the RSU 150 and find out the current charge level of vehicle 160.
    - Knowing the current charge level can help create attractive offers including pushing the notification to the driver. In case of verbal orders, it can alert the order-taking clerk to offer this to the driver of vehicle 160.
    - If the V2X communication also allows finding out the desired destination through the map in-use, it can further make an attractive proposal based on estimation of feasible range.
2. As a separate feature, the driver of vehicle 160 may also get an unsolicited notification when vehicle 160 is in the vicinity of such a drive-thru.
3. While placing the order, the ordering system can offer to add additional charging services, as well (e.g., in addition to the food order).
4. The interaction for this could happen over the ordering kiosk 604, an app on customer's smartphone or smart-dashboard in the vehicle or could even be verbal.
    - As an alternative embodiment, a camera based LPR system, such as including camera 608, could identify a regular visitor who may have opted in/signed up for automated charging by default. In such a case, charging can soon as vehicle 160 is recognized and has started in a long queue even before the user has an opportunity to interact and select charging option. Users of several popular drive-thru businesses experience longer lines during peak hours and can benefit from these long rolls in those lines by obtaining significant amount of charging. Also, another example could include long taxi lines at airports when the taxi drivers are waiting and rolling along the lines to pick up passengers.
5. After the user accepts the offer, the WPT system, aided by the cloud-based supervisory service 170, authenticates the transaction including necessary billing logistics and authorizes the WPT to administer quasi-dynamic and dynamic operation, to deliver the charge as vehicle 160 moves along the drive-thru track.
6. When vehicle 160 finally reaches the end of the track, the WPT system closes the transaction and informs supervisory service 170 that the charging operation is complete.
7. Supervisory service 170 completes the transaction and record the necessary billing information. If the preferred method was so chosen, it may provide notification to the user through the smartphone or dashboard app.

The covered scenarios can also include a situation where the WPT is simultaneously charging multiple vehicles in the drive-thru queue, according to each vehicle's charging needs.

Figure 7:
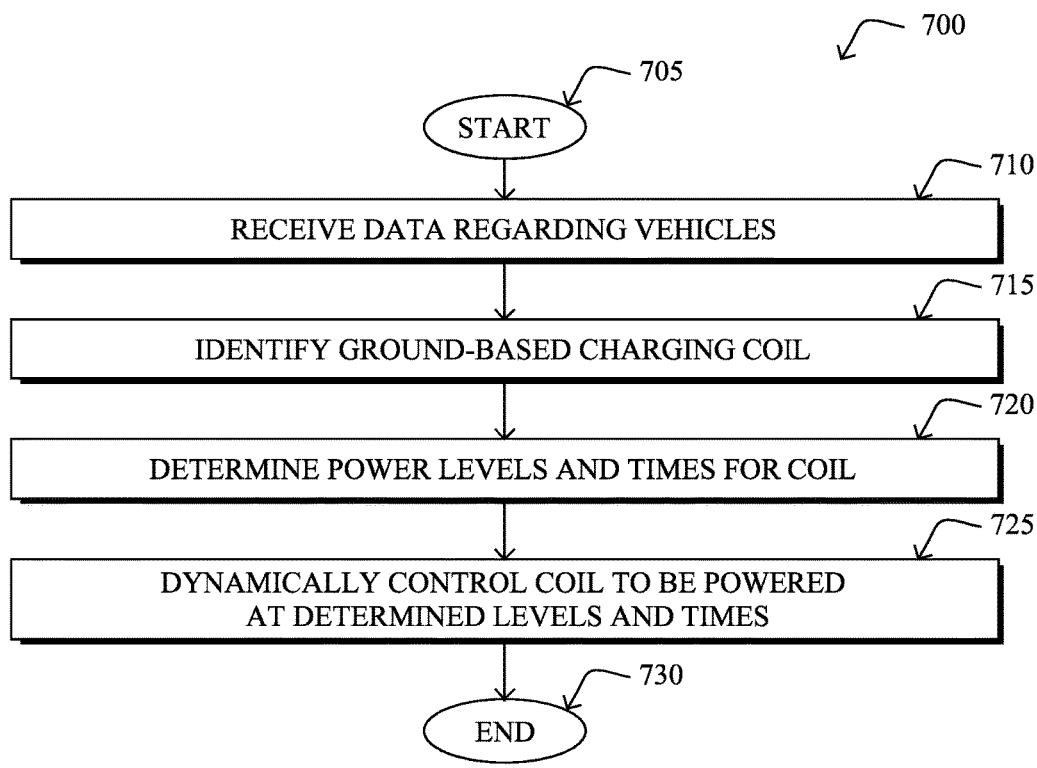
FIG. 7 illustrates an example simplified procedure for powering a ground-based charging coil.

FIG. 7 illustrates an example simplified procedure for powering a ground-based charging coil, in accordance with one or more embodiments described herein. For example, a non-generic, specifically configured device (e.g., device 200) may perform procedure 700 by executing stored instructions (e.g., process 248). The procedure 700 may start at step 705, and continues to step 710, where, as described in greater detail above, the device may receive vehicle characteristic data regarding a set of vehicles. In various embodiments, the vehicle characteristic data may indicate any or all of the following: different makes and models of the vehicles, different battery ages of the vehicles, feedback data regarding power transferred from a ground-based charging coil to a particular one of the vehicles, maintenance records for the vehicles, authentication information, location information, movement information, or the like.

At step 715, as detailed above, the device may identify, based on the received characteristic data, a particular ground-based charging coil with which charging coils of the vehicles are expected to be in close proximity. For example, based on the location information and/or movement information (e.g., velocities, etc.) in the characteristic data, the device may determine that the vehicles will pass over a particular ground-based charging coil.

At step 720, the device may determine a set of power levels and times at which the particular ground-based charging coil is to be powered, as described in greater detail above. In particular, based on the received vehicle characteristic data regarding the set of vehicles, the device may determine how much the ground-based charging coil should be powered, as well as when. For example, the device may estimate a power level of the ground-based charging coil that would result after charging a first one of the vehicles. In turn, the device may determine a difference between the estimated power level of the ground-based charging coil and a power level associated with a second one of the vehicles, to determine the amount of power that is to be supplied to the coil in advance of the second vehicle. In another embodiment, the device may determine that the coil should not be powered for one of the vehicles.

At step 725, as detailed above, the device may dynamically control the ground-based charging coil to be powered at the determined power levels and times. For example, the device may control the coil to be powered to a higher power level for a first one of the vehicles, then to a lower power level for a second one of the vehicles, according to the capabilities and charging needs of the vehicles. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Therefore, the techniques herein allow for customized charging of a ground-based vehicle charging coil in a wireless power transfer (WPT) system, based on information obtained about an individual vehicle. Doing so improves the power transfer to the individual vehicles and optimizes the infrastructure across multiple coils.

While there have been shown and described illustrative embodiments that provide for intelligent coil control in a vehicle WPT system, it is to be understood that various other adaptations and modifications may be made within the spirit and scope of the embodiments herein. For example, while the techniques herein are described particularly with respect to automobiles, the techniques herein can be applied to any known form of vehicle, such as autonomous vehicles, aerial vehicles, drones, and the like.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    receiving, at a device in a network, vehicle characteristic data regarding a set of vehicles;
    identifying, by the device and based on the received vehicle characteristic data regarding the set of vehicles, a particular ground-based charging coil with which charging coils of the set of vehicles are expected to be in a close proximity;
    determining, by the device and based on the received vehicle characteristic data regarding the set of vehicles, a set of power levels and times at which the particular ground-based charging coil is to be powered; and
    dynamically controlling, by the device, the particular ground-based charging coil to be powered at the determined set of power levels and times.

2. The method as in claim 1, further comprising:
    receiving, at the device, feedback data regarding a power transferred from the ground-based charging coil to a particular one of the vehicles;
    updating, by the device, a machine learning-based power transfer model for the particular vehicle using the received feedback data; and
    using, by the device, the machine learning-based power transfer model for the particular vehicle to determine a power level for a second ground-based charging coil that is to charge the particular vehicle.

3. The method as in claim 1, wherein the vehicle characteristic data is indicative of different makes and models of the set of vehicles, and wherein the set of power levels for the particular ground-based charging coil are determined based in part on the different makes and models of the set of vehicles.

4. The method as in claim 1, wherein the determining a set of power levels and times at which the particular ground-based charging coil is to be powered comprises:
    estimating, by the device, a power level of the particular ground-based charging coil that would result after charging a first vehicle of the set of vehicles; and
    determining, by the device, a difference between the estimated power level of the particular ground-based charging coil and a power level associated with a second vehicle of the set of vehicles.

5. The method as in claim 4, wherein the determining a set of power levels and times at which the particular ground-based charging coil is to be powered comprises further:
    determining, by the device and based on the determined difference, that the particular ground-based charging coil should not be supplied power at a time at which the charging coil of the second vehicle is expected to be in a close proximity to the particular ground-based charging coil.

6. The method as in claim 1, wherein the vehicle characteristic data is indicative of different battery ages of the set of vehicles, and wherein the set of power levels for the particular ground-based charging coil arc determined based in part on the different battery ages of the set of vehicles.

7. The method as in claim 1, wherein the set of power levels and times are determined further based on a road condition or weather condition affecting the particular ground-based charging coil.

8. The method as in claim 1, wherein the particular ground-based charging coil is embedded in a drive-thru, and wherein the set of power levels and times are determined further based on an input received via an ordering kiosk of the drive-thru, a license plate reader, a camera, or a mobile device associated with one vehicle of the set of vehicles.

9. The method as in claim 1, wherein the determining a set of power levels and times at which the particular ground-based charging coil is to be powered comprises:
    determining, by the device, a distance between a particular vehicle of the set of vehicles and the particular ground-based charging coil.

10. An apparatus, comprising:
    one or more network interfaces to communicate with a network;
    a processor coupled to the network interfaces and configured to execute one or more processes; and
    a memory configured to store a process executable by the processor, the process when executed configured to:
        receive vehicle characteristic data regarding a set of vehicles;
        identify, based on the received vehicle characteristic data regarding the set of vehicles, a particular ground-based charging coil with which charging coils of the set of vehicles are expected to be in a close proximity;
        determine, based on the received vehicle characteristic data regarding the set of vehicles, a set of power levels and times at which the particular ground based charging coil is to be powered; and
        dynamically control the particular ground-based charging coil to be powered at the determined set of power levels and times.

11. The apparatus as in claim 10, wherein the process when executed is further configured to:
    receive feedback data regarding a power transferred from the particular ground-based charging coil to a particular vehicle of the set of vehicles;
    update a machine learning-based power transfer model for the particular vehicle using the received feedback data; and
    use the machine learning-based power transfer model for the particular vehicle to determine a power level for a second ground-based charging coil that is to charge the particular vehicle.

12. The apparatus as in claim 10, wherein the vehicle characteristic data is indicative of different makes and models of the set of vehicles, and wherein the set of power levels for the particular ground-based charging coil are determined based in part on the different makes and models of the set of vehicles.

13. The apparatus as in claim 10, wherein the apparatus determines the set of power levels and times at which the particular ground-based charging coil is to be powered by:
estimating a power level of the particular ground-based charging coil that would result after charging a first vehicle of the set of vehicles; and
determining a difference between the estimated power level of the particular ground-based charging coil and a power level associated with a second vehicle of the set of vehicles.

14. The apparatus as in claim 13, wherein the apparatus determines the set of power levels and times at which the particular ground-based charging coil is to be powered further by:
determining, based on the determined difference, that the particular ground-based charging coil should not be supplied power at a time at which the charging coil of the second vehicle is expected to be in a close proximity to the particular ground-based charging coil.

15. The apparatus as in claim 10, wherein the vehicle characteristic data is indicative of different battery ages of the set of vehicles, and wherein the set of power levels for the particular ground-based charging coil are determined based in part on the different battery ages of the set of vehicles.

16. The apparatus as in claim 10, wherein the vehicle characteristic data for one vehicle of the set of vehicles comprises data from a license plate reader, a camera, or a vehicle navigation system.

17. The apparatus as in claim 10, wherein the particular ground-based charging coil is embedded in a drive-thru, and wherein the set of power levels and times is determined further based on an input received via an ordering kiosk of the drive-thru or a mobile device associated with one vehicle of the set of vehicles.

18. The apparatus as in claim 10, wherein the apparatus determines the set of power levels and times at which the particular ground-based charging coil is to be powered by:
determining a distance between a particular vehicle of the set of vehicles and the particular ground-based charging coil.

19. A tangible, non-transitory, computer-readable medium storing program instructions that cause a device to execute a process comprising:
receiving, at the device, vehicle characteristic data regarding a set of vehicles;
identifying, by the device and based on the received vehicle characteristic data regarding the set of vehicles, a particular ground-based charging coil with which charging coils of the set of vehicles are expected to be in a close proximity;
determining, by the device and based on the received vehicle characteristic data regarding the set of vehicles, a set of power levels and times at which the particular ground-based charging coil is to be powered; and
dynamically controlling, by the device, the particular ground-based charging coil to be powered at the determined set of power levels and times.

20. The computer-readable medium as in claim 19, wherein the process further comprises:
receiving, at the device, feedback data regarding a power transferred from the particular ground-based charging coil to a particular vehicle of the set of vehicles;
updating, by the device, a machine learning-based power transfer model for the particular vehicle using the received feedback data; and
using, by the device, the machine learning-based power transfer model for the particular vehicle to determine a power level for a second ground-based charging coil that is to charge the particular vehicle.

* * * * *